(12) United States Patent
Plummer et al.

(10) Patent No.: US 8,176,491 B1
(45) Date of Patent: May 8, 2012

(54) FAST SYNCHRONIZATION OF SIMPLE SYNCHRONIZED METHODS

(75) Inventors: Christopher J. Plummer, San Martin, CA (US); Yin Zin Mark Lam, Milpitas, CA (US)

(73) Assignee: Oracle America, Inc., Redwood City, CA (US)

( * ) Notice: Subject to any disclaimer, the term of this patent is extended or adjusted under 35 U.S.C. 154(b) by 1445 days.

(21) Appl. No.: 11/499,123

(22) Filed: Aug. 4, 2006

(51) Int. Cl.
*G06F 9/46* (2006.01)

(52) U.S. Cl. ......... 718/100; 717/136; 717/147; 717/151

(58) Field of Classification Search .................. None
See application file for complete search history.

(56) References Cited

U.S. PATENT DOCUMENTS

| | | | | |
|---|---|---|---|---|
| 5,946,487 | A * | 8/1999 | Dangelo ........................ | 717/148 |
| 6,119,115 | A * | 9/2000 | Barr ........................ | 1/1 |
| 6,230,230 | B1 * | 5/2001 | Joy et al. ........................ | 710/200 |
| 6,314,563 | B1 * | 11/2001 | Agesen et al. ................ | 717/108 |
| 6,330,714 | B1 * | 12/2001 | Hicks et al. ................ | 717/131 |
| 6,385,764 | B1 * | 5/2002 | Blandy et al. ................ | 717/127 |
| 6,510,437 | B1 * | 1/2003 | Bak et al. ...................... | 707/783 |
| 6,542,891 | B1 * | 4/2003 | Loen et al. .................... | 717/118 |
| 6,557,168 | B1 * | 4/2003 | Czajkowski ................ | 717/151 |
| 6,735,760 | B1 * | 5/2004 | Dice ........................ | 717/139 |
| 6,757,891 | B1 * | 6/2004 | Azagury et al. .............. | 717/158 |
| 6,799,236 | B1 * | 9/2004 | Dice et al. .................... | 710/200 |
| 6,938,054 | B2 * | 8/2005 | Goode et al. .................. | 1/1 |
| 7,080,375 | B2 * | 7/2006 | Martin ........................ | 718/100 |
| 7,120,762 | B2 * | 10/2006 | Rajwar et al. ................ | 711/150 |
| 2003/0079203 | A1 * | 4/2003 | Sokolov ........................ | 717/118 |
| 2003/0191867 | A1 * | 10/2003 | Czajkowski ................ | 709/315 |
| 2003/0217327 | A1 * | 11/2003 | Ogasawara .................. | 714/798 |
| 2004/0006583 | A1 * | 1/2004 | Shaylor et al. ................ | 709/102 |
| 2004/0015912 | A1 * | 1/2004 | Bottomley .................... | 717/148 |
| 2004/0221272 | A1 * | 11/2004 | Wu et al. ...................... | 717/128 |
| 2006/0026565 | A1 * | 2/2006 | Cabillic et al. ................ | 717/118 |
| 2006/0053422 | A1 * | 3/2006 | Alikacem et al. ............ | 718/100 |

OTHER PUBLICATIONS

Venners, Bill, "How the Virtual Machine Performs Thread Synchronization," Java World, Jul. 1, 1997, located on the internet at http://www.javaworld.com/javaworld/jw-07-1997/jw-07-hood.html, 3 pages.

* cited by examiner

*Primary Examiner* — Emerson Puente
*Assistant Examiner* — Hiren Patel
(74) *Attorney, Agent, or Firm* — Osha • Liang LLP

(57) ABSTRACT

A mechanism is disclosed for implementing fast synchronization of simple synchronized methods in a virtual machine. The mechanism provides for determining, during runtime, whether a set of instructions can be fully executed in lieu of invoking a synchronized method, which requires locking of a particular object. The set of instructions provides equivalent functionality to the synchronized method but with less locking overhead. In response to a determination that the set of instructions can be fully executed, the set of instructions is fully executed to achieve equivalent functionality to the synchronized method in lieu of invoking the synchronized method. In response to a determination that the set of instructions cannot be fully executed, the synchronized method is invoked. With this mechanism, simple synchronized methods can be executed with less locking overhead.

23 Claims, 7 Drawing Sheets

Fig. 2A

200 Example of a Simple Synchronized Method

```
public synchronized int size( ) {
    return elementCount;
}
```
(202 points to `return elementCount;`)

Fig. 2B

204 Example of Substitute Code for a Simple Synchronized Method

```
private int sizeSimpleSync( ) {
    if (CVM.simpleLockGrab(this)) {
        int result =elementCount;
        CVM.simpleLockRelease(this);
        return result;
    }
    return size( );
}
```

206A → `if (CVM.simpleLockGrab(this)) {`
206B → `int result =elementCount;`
206C → `CVM.simpleLockRelease(this);`
206D → `return result;`
208 → `return size( );`

FAST SYNCHRONIZATION OF SIMPLE SYNCHRONIZED METHODS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In virtual machines, synchronization is the process of governing the access of multiple threads to a shared object. For example, during the execution of Java applications in a Java Virtual Machine (JVM), a thread may synchronize on a shared object by obtaining a lock on the object. By obtaining the lock, the thread ensures that, while it is operating on the object or a resource associated with the object, the object or the associated resource will not be modified by another thread, as long as all threads attempt to obtain the lock before making any modifications. This helps to ensure data consistency and integrity.

In one traditional locking approach for a JVM, a thread obtains a lock on an object by invoking a locking function of the JVM. The locking function, which is now being executed by the thread, creates a heavy-weight lock (HWL) data structure, and associates the HWL data structure with the object that is being locked. In addition, the locking function calls down to the operating system (OS) and requests an OS-level locking structure, such as, for example, a mutex. After the mutex is obtained and associated with the HWL data structure, the locking function calls down to the OS again to obtain ownership of the mutex. Once that is done, the thread owns a lock on the object and no other thread will be allowed to lock the object until the thread releases the mutex. When another thread attempts to lock the object (i.e. contends for the lock on the object), the contending thread executes the locking function, which calls down to the OS. The OS determines that a mutex on the object is already granted and blocks the contending thread. The OS unblocks the contending thread after the mutex on the object has been released, and at this point the contending thread can obtain ownership of the mutex to lock the object.

In the above traditional locking approach, the creation of a HWL data structure and the setup of a OS-level mutex is relatively resource intensive. It has been observed that, in a majority of cases in which a lock is obtained on an object, no locking contention actually occurs. That is, a thread obtains the lock and releases the lock on the object before any other thread tries to obtain a lock on that object. Thus, in most cases, the HWL data structure and the mutex are not used, and the locking overhead is incurred needlessly. In light of this observation, some JVM's have been enhanced to implement a fast locking approach. According to this approach, a JVM does not create a HWL data structure each time an object is locked. Rather, the JVM utilizes a light-weight, fast lock (FL) data structure, which is much less resource intensive to obtain and initialize than the HWL data structure. Only when there is actual locking contention will the JVM create the HWL data structure and request a mutex from the OS.

One example implementation of the fast locking approach may be as follows. When a first thread desires a lock on an object, it invokes the locking function of the JVM. The locking function (which is now being executed by the first thread), detects that this is the first request to lock the object; hence, the locking function obtains and initializes an FL data structure and associates it with the object. The locking function does not create an HWL data structure, nor does it call down to the OS to obtain a mutex. If the first thread releases the lock on the object before any other thread tries to lock that same object, then the locking function simply destroys the FL data structure, and the HWL data structure is never created.

If, however, a second thread invokes the locking function of the JVM to lock the object, the locking function (which is now being executed by the second thread) detects that the FL data structure has already been obtained and initialized by the first thread which has already locked the object. Thus, the locking function determines that there is lock contention for the object. In response, the locking function creates an HWL data structure and calls down to the OS to request a mutex. After the mutex is obtained and associated with the HWL data structure, the locking function calls the OS on behalf of the first thread and causes ownership of the mutex to be associated with the first thread. After the first thread obtains ownership of the mutex, the HWL data structure is associated with the object; thus, the first thread now owns an actual lock on the object. Thereafter, the locking function calls down to the OS again and tries to lock on the mutex, this time on behalf of the second thread. Because the mutex is now owned by the first thread, the second thread cannot obtain the mutex. As a result, the second thread blocks and waits. The OS unblocks the second thread at some point after the mutex is released by the first thread. At that point, the second thread will be allowed to obtain ownership of the mutex and an actual lock on the object. In this manner, the fast locking approach provides that the JVM creates an HWL data structure and requests a mutex from the OS only when there is actual locking contention.

However, even though the fast locking approach provides for avoiding the overhead associated with creating a HWL data structure and obtaining an OS-level mutex, the fast locking approach is still resource-expensive since it still requires the execution of a few dozen extra instructions in order to obtain, initialize, and then release the FL data structure. This overhead caused by the fast locking approach is particularly apparent in cases where a thread executes a fairly trivial synchronized method.

For example, consider the following Java "Counter" class and the synchronized "increment( )" method declared therein:

```
class Counter {
public int count;
public synchronized void increment( ){
    count=count+1;
}
}
```

A thread, which has instantiated an object of the "Counter" class, needs to execute only three instructions to increment the public variable "count". However, since the "increment( )" method is declared with the "synchronized" keyword and thus must be synchronized, a few dozen extra instructions must be executed to implement fast locking when the method is called from the thread. In some JVM implementations, the thread needs to execute 60-80 additional instructions when it calls the method in order to provide for proper locking by using a FL data structure and an additional 50-60 instructions for proper unlocking after the method is executed. Thus, even though the "increment( )" method is trivial and requires only three instructions, the fast locking approach would require the execution of additional 110-140 instructions to implement the required synchronization. In this manner, the fast locking approach introduces a significant overhead when it is used to synchronize methods that are fairly simple.

Based on the foregoing, there is a clear need for techniques for executing simple synchronized methods with locking overhead that is less than the overhead caused by the traditional and fast locking approaches described above.

SUMMARY

In the following description, "fast locking" refers to the approach described above which uses FL data structures to accelerate the locking of objects over the traditional approach. "Fast synchronization" refers to the techniques described hereinafter that achieve locking semantics with faster performance over the fast locking approach.

According to one embodiment, provided is a mechanism for fast synchronization of simple synchronized methods in a virtual machine. This mechanism enables the execution of simple synchronized methods with less locking overhead.

In one embodiment, a dynamic adaptive compiler in a virtual machine determines, during compile time, that a method being compiled is a simple synchronized method for which substitute code has been provided and registered in the virtual machine. Based on the substitute code, the dynamic adaptive compiler emits: (1) a set of instructions that provide equivalent functionality to the simple synchronized method, and (2) a set of conditional invocation instructions for conditionally invoking the simple synchronized method. The set of instructions that provide equivalent functionality to the simple synchronized method is referred to hereinafter as the "synchronized instructions", and includes instructions that are executed either while other threads cannot lock the object (in some embodiments) or while the object is locked (in other embodiments.) The set of conditional invocation instructions for conditionally invoking the simple synchronized method is referred to hereinafter as "conditional invocation instructions", and includes instructions for conditional invocation of the simple synchronized method as well as instructions for invoking functions that provide locking semantics. (Examples of such functions include the "simpleLockGrab( )" and "simpleLockRelease( )" functions that are described hereinafter.) The dynamic adaptive compiler will normally choose to inline the synchronized instructions and the conditional invocation instructions in place of the call to the simple synchronized method.

During runtime, a thread executes the conditional invocation instructions to determine whether the synchronized instructions can be executed in lieu of invoking the simple synchronized method. In response to a determination that the synchronized instructions can be executed, the thread executes the synchronized instructions in lieu of invoking the simple synchronized method. In response to a determination that the synchronized instructions cannot be fully executed in lieu of the simple synchronized method, the simple synchronized method is invoked.

In some embodiments, equivalent functionality to the simple synchronized method is provided without locking the particular object that is being synchronized upon. Depending on the capabilities provided by the underlying OS and/or hardware platforms, in one embodiment equivalent functionality to the simple synchronized method is achieved without locking the object by obtaining, and holding during the duration of the synchronization, an OS-provided thread scheduler lock which, when obtained by a current thread, prevents all other threads from being scheduled and executed. In another embodiment, equivalent functionality is achieved without locking the object by obtaining, and holding during the duration of the synchronization, a JVM-provided microlock that prevents all other threads from obtaining a lock on any object.

In one embodiment, the underlying hardware platform provides an atomic compare-and-swap instruction that is used by a JVM to ensure that locking and unlocking operations on objects are performed in an atomic manner. In this embodiment, equivalent functionality to the simple synchronized method is achieved by locking the particular object that is being synchronized upon but with less overhead than would otherwise be incurred. In this embodiment, the conditional invocation instructions assist in achieving equivalent functionality to the simple synchronized method by executing a single atomic compare-and-swap instruction to store, in the object header of the object being locked, a lock record pointer to a lock record that is dedicated to, and pre-populated with information about, the current thread that is executing the synchronized instructions and the conditional invocation instructions.

BRIEF DESCRIPTION OF THE DRAWINGS

FIG. 2A is a block diagram illustrating an example of a simple synchronized method for which synchronization may be performed according to one embodiment.

FIG. 2B is a block diagram illustrating an example of substitute code, which can be processed according to one embodiment, for the simple synchronized method illustrated in FIG. 2A.

DETAILED DESCRIPTION OF EMBODIMENT(S)

Conceptual Overview

Figure 1B:
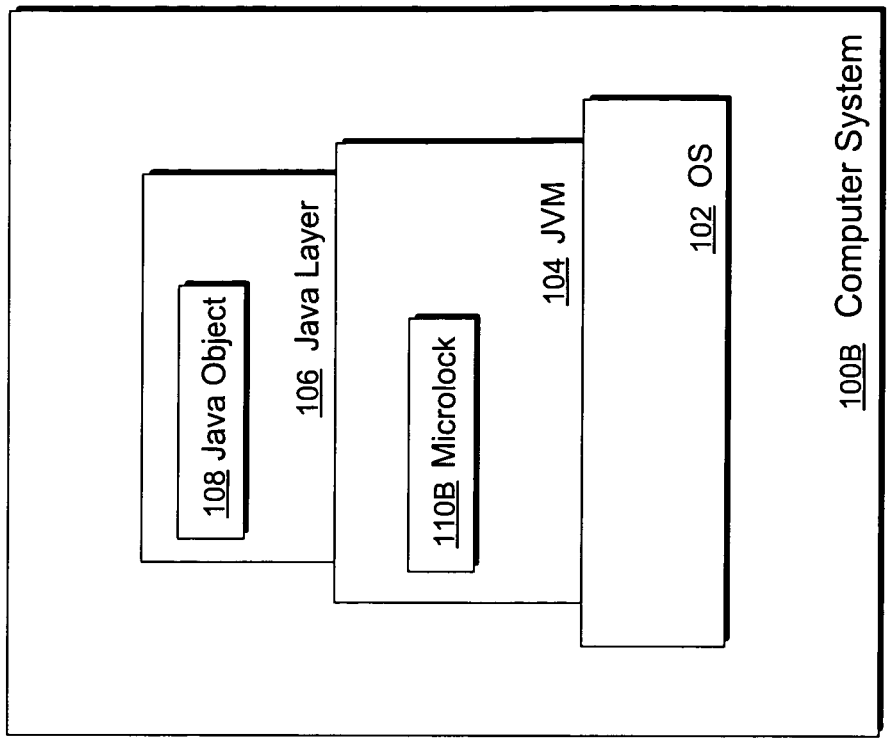
FIG. 1B is a block diagram of another system in which an embodiment may be implemented.

According to one embodiment, provided is a mechanism for fast synchronization of simple synchronized methods. This mechanism enables the execution of simple synchronized methods with less locking overhead. (As used herein, locking overhead refers to the computer resources that are expended for performing one or more locking and/or unlocking operations for synchronizing on an object.)

A simple synchronized method makes no calls to other methods that will not be inlined by a dynamic adaptive or Just-In-Time (JIT) compiler during dynamic compilation of the synchronized method. Hereinafter, the terms dynamic adaptive compiler and JIT compiler will be used interchangeably to refer to the runtime compiler in a virtual machine. In addition, in some embodiments a simple synchronized method may be a method that either does not throw any exceptions while synchronized or throws exceptions that can be prevented by performing some additional checks.

In one embodiment, a dynamic adaptive compiler in a virtual machine determines, during compile time, that a method being compiled is a simple synchronized method for which substitute code has been provided and registered in the virtual machine. Based on the substitute code, the dynamic adaptive compiler emits: (1) synchronized instructions that provide equivalent functionality to the simple synchronized method, and (2) conditional invocation instructions for conditionally invoking the simple synchronized method. The dynamic adaptive compiler then inlines the synchronized instructions and the conditional invocation instructions in place of the call to the simple synchronized method.

During runtime, a thread executes the set of conditional invocation instructions to determine whether the synchronized instructions can be executed in lieu of invoking the simple synchronized method. In response to a determination that the synchronized instructions can be executed, the thread executes the synchronized instructions in lieu of invoking the simple synchronized method. In response to a determination that the synchronized instructions cannot be fully executed in lieu of the simple synchronized method, the simple synchronized method is invoked.

FIG. 2A provides example 200 of a simple synchronized method that may be synchronized in a JVM according to the techniques described herein. FIG. 2A illustrates the simple synchronized method "size( )" from the "java.util.Vector" class. The "size( )" method includes source code line 200, which returns the number of elements stored in a vector object instantiated from the "java.util.Vector" class.

FIG. 2B provides example 204 of substitute code for the simple synchronized method illustrated in FIG. 2A, which substitute code comprises private method "sizeSimpleSync( )". (In some embodiments, substitute code 204 may be provided by a software developer; in other embodiments, the substitute code may be generated automatically by a JIT compiler or by any other software component that can pre-process, translate, or transform source code written in a particular object-oriented programming language.) The underlying JVM may store a mapping between the simple synchronized method "size( )" and the substitute "sizeSimpleSync( )" method, and this mapping may be used by a JIT compiler of the JVM during compile time to determine whether substitute code for the "size( )" method is provided.

As illustrated in FIG. 2B, the "sizeSimpleSync( )" method includes source code lines 206A, 206B, 206C, 206D, and 208. During compile time, the JIT compiler of the JVM uses source code line 206A, 206C, and 208 to generate a set of conditional invocation instructions for invoking the simple synchronized method "size( )", and source code lines 206B, 206C, and 206D to generate the synchronized instructions that provide equivalent functionality to the simple synchronized method "size( )".

Source code line 206A is a conditional statement for determining, during runtime, whether the synchronized instructions can be executed in lieu of the simple synchronized method "size( )". Source code line 206A includes a call to function "simpleLockGrab( )", which call is normally inlined to gain performance benefits during runtime. The "simpleLockGrab( )" function, when executed successfully, prevents any threads other than the current thread from synchronizing on the object from which the "size( )" method is invoked. (The implementation of the "simpleLockGrab( )" function depends on the particular OS and/or hardware platform, and examples of implementing the "simpleLockGrab( )" function on different platforms is provided in separate sections hereinafter.) The "simpleLockGrab( )" function returning a "failure" status during runtime means that the object cannot be cheaply and easily locked, for example, if the object is already locked by another thread. In this case, the set of conditional invocation instructions generated by the JIT compiler based on source code line 208 provide for invoking the simple synchronized method "size( )" in the normal way provided by the JVM, which normal way may require locking of the object according to the fast locking and/or traditional locking approaches.

The "simpleLockGrab( )" function returning a "success" status during runtime means that the object has been cheaply and easily locked according to the techniques described herein. In this case, the synchronized instructions generated by the JIT compiler based on source code lines 206B, 206C, and 206D are executed in lieu of invoking the simple synchronized method "size( )". The instructions generated by the JIT compiler based on source code line 206B provide for storing the value of "elementCount" instance variable of the object in the local variable "result"; the instructions generated based on source code line 206C provide for releasing any locks that have been acquired during the fast synchronization; and the instructions generated based on source code line 206D provide for returning the result that would have been returned by the "size( )" method. In this way, equivalent functionality to the "size( )" method is achieved but with locking overhead which is less that the locking overhead that would be incurred when the "size( )" method is invoked in the normal way provided by the JVM.

The techniques for fast synchronization described herein can provide three factors that lead to gaining performance benefits when a simple synchronized method is executed during runtime: inlining the method, inlining the synchronized instructions, and executing less code because of the cheaper way the synchronization is achieved. In the example of the fast synchronization described with respect to FIGS. 2A and 2B, causing private method "sizeSimpleSync( )" to be executed instead of the original simple synchronized method "size( )" is handled during compile time when the JIT compiler inlines the method. While typically simple synchronized methods such as "size( )" are difficult to inline and are not usually inlined, in the above example the JIT compiler is capable of fully inlining the "sizeSimpleSync( )" method because this method is not a synchronized method. In addition, during compile time the JIT compiler uses intrinsic emitters to generate the instructions corresponding to functions "simpleLockGrab( )" and "simpleLockRelease( )", which allows the JIT compiler to inline the instructions instead of using calls to assembly code, thus allowing for more efficient execution. Finally, the number of instructions emitted for functions "simpleLockGrab( )" and "simpleLockRelease( )" is much less than the number of synchronization instructions used according to the traditional and fast locking approaches, which provides for gaining an additional performance benefit over these approaches.

Functional Overview

Figure 3A:
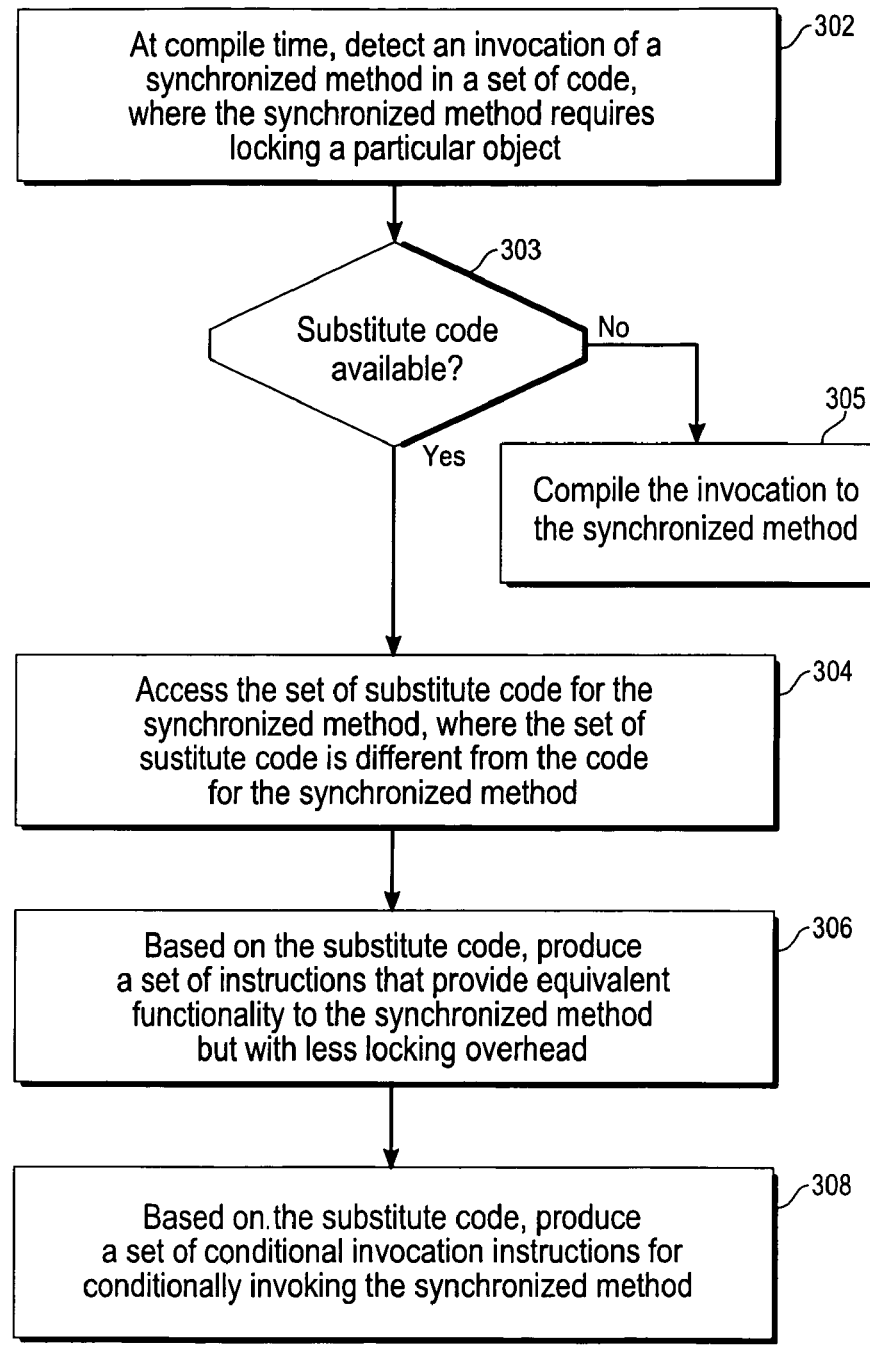
FIG. 3A is a flow diagram illustrating a process for emitting instructions based on substitute code for a simple synchronized method according to one embodiment.

FIG. 3A is a flow diagram illustrating a process for emitting substitute code for a simple synchronized method according to one embodiment.

At compile time, in step 302 a dynamic adaptive compiler detects an invocation of a synchronized method in a set of code, which synchronized method requires locking a particular object. In step 303, the dynamic adaptive compiler determines whether there is a set of substituted code that is associated with the synchronized method. (In one embodiment, the set of substitute code may be written by a programmer. In another embodiment, the set of substitute code may be pre-generated automatically and pre-registered with the virtual machine before deployment. In yet another embodiment, the set of substitute code may be generated and registered with the virtual machine at runtime. Thus, the fast synchronization techniques described herein are not limited to any particular manner of generating the set of substitute code.) If no substitute code is associated with or registered for the synchronized method, in step 305 the dynamic adaptive compiler proceeds with compiling the invocation to the synchronized method.

If in step 303 a determination is made that a set of substitute code is registered for the synchronized method, then step 304 is processed. In step 304, the dynamic adaptive compiler accesses substitute code for the synchronized method. The substitute code is different than the code for the synchronized method, but can be used to generate synchronized instructions which, when executed, provide equivalent functionality to the synchronized method but with less locking overhead.

In step 306, the dynamic adaptive compiler generates the synchronized instructions based on the substitute code. In some embodiments, the synchronized instructions achieve equivalent functionality to the synchronized method without locking the particular object. In other embodiments, the synchronized instructions achieve equivalent functionality to the synchronized method by locking the particular object in fewer instructions than the instructions that would be used by the synchronized method to lock the particular object.

Based on the substitute code, in step 308 the dynamic adaptive compiler also generates a set of conditional invocation instructions for conditionally invoking the synchronized method. Thereafter, the dynamic adaptive compiler inlines the synchronized instructions and the set of conditional invocation instructions in the set of code in place of the call to the synchronized method.

Figure 3B:
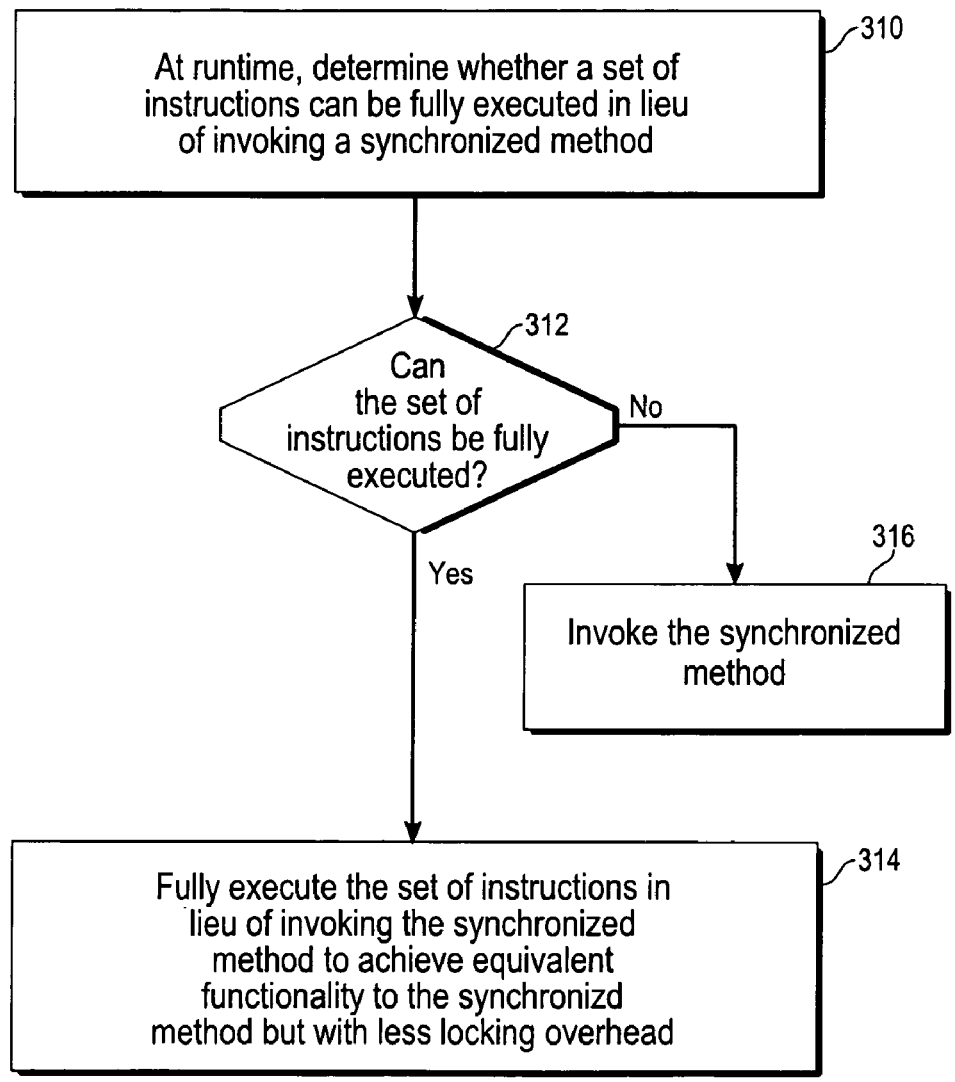
FIG. 3B is a flow diagram illustrating a process for executing a simple synchronized method according to one embodiment.

FIG. 3B is a flow diagram illustrating a process for executing a simple synchronized method according to one embodiment.

At runtime, a current thread executes the instructions emitted by the dynamic adaptive compiler. In step 310, the thread executes the set of conditional invocation instructions to determine whether the inlined synchronized instructions can be fully executed in lieu of the synchronized method, but with less locking overhead.

In step 312, a determination is made of whether the synchronized instructions can be fully executed in lieu of the synchronized method. For example, the current thread may execute one or more instructions to determine whether the particular object, which must be locked for the purposes of synchronization, is already locked by another thread. If the particular object is already locked, then a determination is made that the synchronized instructions cannot be executed in lieu of the synchronized method with less locking overhead. In addition, or instead of, the determination of whether the synchronized instructions can be executed may be also based on conditions that are specific to the fast synchronization implementation for the specific OS and/or hardware platform. For example, in some embodiments, after obtaining the thread scheduler lock (which is provided by the OS to control the operation of the thread scheduler), the determination of whether the synchronized instructions can be executed in lieu of the synchronized method may be based on whether the object is already locked by another thread. In other embodiments, the determination may be based on whether the operation of obtaining a microlock succeeds or fails, where the microlock is provided by the virtual machine to ensure that threads perform locking and unlocking operations in an atomic manner. In yet other embodiments, the determination of whether the synchronized instructions can be executed may be based on whether the object is already locked by another thread and/or on the success or failure of an atomic compare-and-swap instruction that is executed as part of locking the particular object.

If in step 312 a determination is made that the synchronized instructions can be executed in lieu of the synchronized method with less locking overhead, then in step 314 the thread fully executes the synchronized instructions to achieve equivalent functionality of the synchronized method but with less locking overhead. Otherwise, if in step 312 a determination is made that the synchronized instructions cannot be executed in lieu of the synchronized method with less locking overhead, then in step 316 the thread executes instructions to invoke the synchronized method itself.

In one embodiment, the processes illustrated in FIGS. 3A and 3B are implemented in a JVM that provides a JIT compiler and is capable of executing instructions emitted by the JIT compiler as well as interpretively executing Java bytecodes that are compiled from source code in the Java programming language. The fast synchronization techniques described herein, however, are not in any way limited to being implemented in a JVM; rather, the techniques described herein may be implemented in any virtual machine that provides a dynamic adaptive compiler or in any computer system that is capable of generating statically or dynamically compiled code. The fast synchronization techniques described herein can also be implemented by any system that does object locking, in which system an "object" may be any data structure available to more than one thread and threads need to synchronize on the objects before performing certain operations.

In addition, the fast synchronization techniques described herein are not limited to being implemented only for synchronized methods. For example, the techniques described herein may be implemented with respect to regions of Java code that need to be synchronized on one or more specific objects and the resources thereof, and do so using the Java "synchronized" keyword. Thus, the techniques for fast synchronization described herein are not limited to being implemented in any particular virtual machine for any particular type of synchronized code, and for this reason the examples involving JVMs and synchronized Java methods provided herein are to be regarded in an illustrative rather than a restrictive sense.

System Overview

Figure 1A:
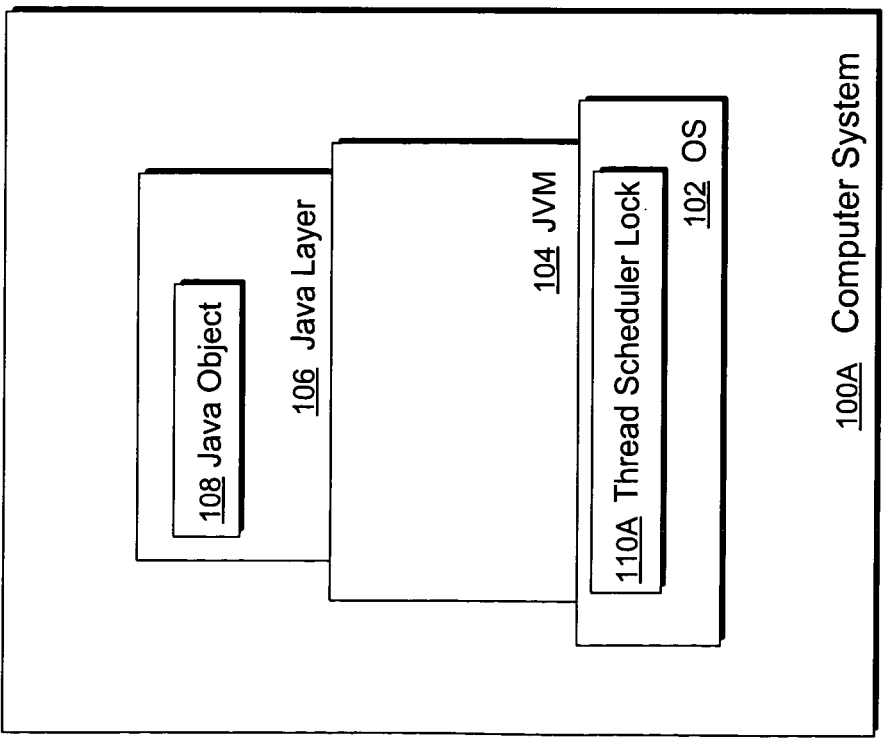
FIG. 1A is a block diagram of a system in which an embodiment may be implemented.
Figure 1C:
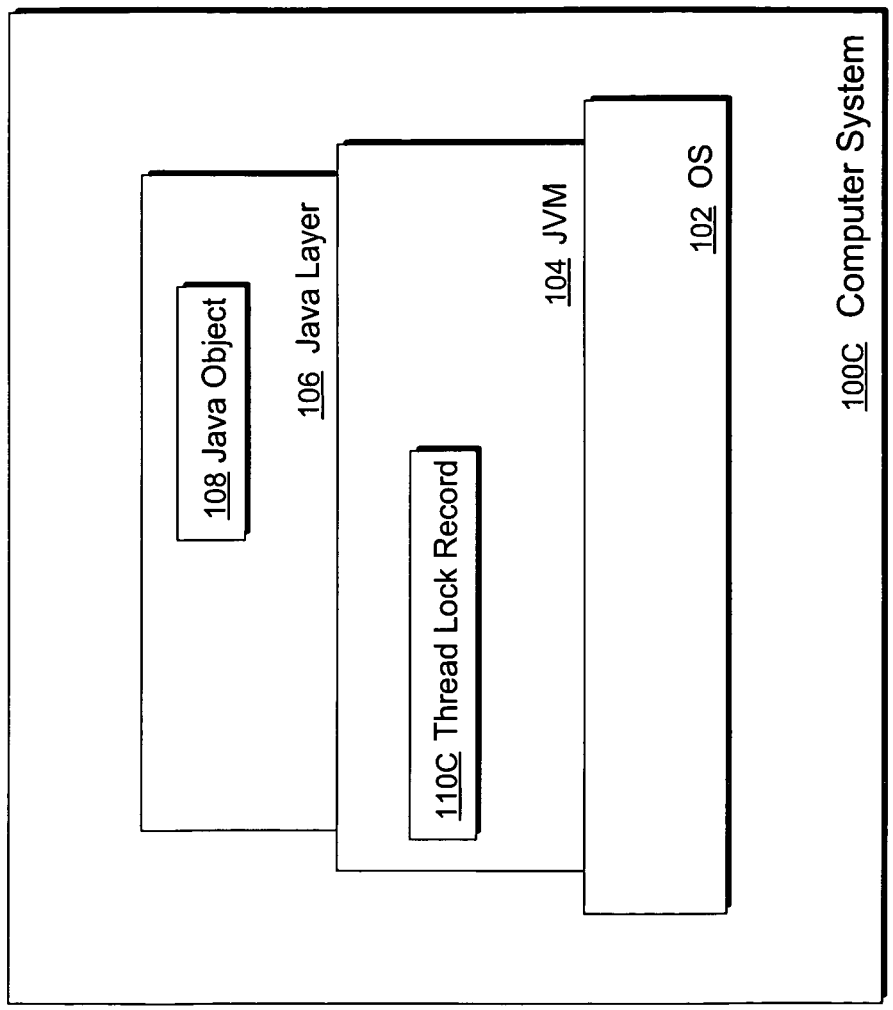
FIG. 1C is a block diagram of another system in which an embodiment may be implemented.

FIGS. 1A, 1B, and 1C are block diagrams of computer systems in which embodiments may be implemented. The computer systems illustrated in FIGS. 1A, 1B, and 1C differ from each other in that the hardware platforms on which the computer systems are implemented provide different locking capabilities. With respect to the different hardware platforms, different implementations of embodiments of the fast synchronization techniques are described hereinafter in separate sections.

For the purpose of illustration, FIGS. 1A, 1B, and 1C depict computer systems 100A, 100B, and 100C, respectively, which include JVM 104. However, it should be noted that the fast synchronization techniques described herein are not limited to JVMs but rather may be applied to any other type of multi-threaded system in which object locking can be implemented. For purposes of the techniques described herein, the functional components of FIGS. 1A, 1B, and 1C may be implemented on any type of computer system, including but not limited to, desktop computers, servers, portable computers (e.g. notebook or laptop computers, personal digital assistants (PDAs), etc.), and other computing devices (e.g. mobile phones).

As shown in FIGS. 1A, 1B, and 1C, computer systems 100A, 100B, and 100C comprise operating system (OS) 102, JVM 104, and Java layer 106. OS 102 provides all of the underlying, low-level functionalities that are relied upon by all of the other components in the computer system. These functionalities include, but are certainly not limited to, managing locks, putting threads to sleep (e.g. causing threads to block and wait), waking threads, implementing thread priority boosting, etc. For purposes of the techniques described herein, OS 102 may be any operating system, including but not limited to Solaris, Unix, Linux, Windows, DOS, Mac OS, etc.

JVM 104 executes on top of OS 102 and provides a platform for supporting execution of Java applications in Java layer 106. In providing the platform, JVM 104 provides many functionalities that are relied upon by the Java applications. One of these functionalities is provided by a locking function, such as, for example, the "simpleLockGrab( )" function illustrated in FIG. 2B. It is the "simpleLockGrab( )" function that is used to implement, at least in part, the fast synchronization techniques described herein.

The Java applications (not shown in FIGS. 1A, 1B, and 1C) in Java layer 106 execute on top of JVM 104. When executing, these Java applications may instantiate, access, and otherwise use one or more Java objects, such as Java object 108. The Java applications may be executed by one or more threads, which are managed by JVM 104 and OS 102. During operation, the threads may perform fast synchronization on one or more Java objects according to the fast synchronization techniques described herein at least in part by invoking the "simpleLockGrab( )" function or instructions emitted therefor by a JIT compiler of JVM 104. Embodiments that encompass different implementations of the "simpleLockGrab( )" function on different OS and/or hardware platforms are described in the sections hereinafter.

Fast Synchronization by Using a Thread Scheduler Lock

FIG. 1A is a block diagram of computer system 100A in which an embodiment may be implemented. In this embodiment, OS 102 provides thread scheduler lock 110A that is used to control the operation of the thread scheduler in the OS. In normal operation, in order to ensure that locking and unlocking operations on Java objects are performed in an atomic manner, a current JVM thread basically locks the thread scheduler for the duration of the locking and unlocking operations, thus preventing any other thread from being scheduled and executed. (As used herein, a locking or an unlocking operation refers to one or more instructions that are executed to lock or unlock a particular Java object). The current Java thread can lock the thread scheduler by making a function call to OS 102 to obtain thread scheduler lock 110A.

According to the fast synchronization techniques described herein, in this embodiment the JVM provides a "simpleLockGrab( )" function which is used to achieve synchronization on an object by using the OS thread scheduler lock but without actually locking the object. When a current thread needs to execute a synchronized method, in order to determine whether synchronized instructions can be executed with less locking overhead in lieu of the synchronized method, the current thread executes a set of conditional invocation instructions that have been generated by a JIT compiler during dynamic compilation and that include instructions for executing the "simpleLockGrab( )" function.

The "simpleLockGrab( )" function, when executed, first makes a call to the OS to obtain the thread scheduler lock, and this call should always succeed because the thread executing the "simpleLockGrab( )" function is the currently scheduled thread. This will prevent all threads from running except for the currently scheduled thread. Thus no other threads will be able to attempt any object locking or unlocking operation while the thread scheduler lock is held. The "simpleLockGrab( )" function then makes a check to determine whether the object is locked by another thread. If the object is already locked by another thread, then the "simpleLockGrab( )" function releases the thread scheduler lock and returns failure, causing the set of conditional invocation instructions to execute the regular bytecodes for the synchronized method.

If the object is not locked by any other thread, the "simpleLockGrab( )" function returns success without releasing the thread scheduler lock. At this point the current thread holds the thread scheduler lock and thus prevents any other thread from being scheduled and executed. In response to receiving success from the "simpleLockGrab( )" function, the set of conditional invocation instructions causes the thread to execute, in lieu of the synchronized method, the synchronized instructions that provide equivalent functionality to the synchronized method. It is noted that, contrary to normal operation, the current thread holds the thread scheduler lock for the duration of execution of the synchronized instructions; further, the current thread executes the synchronized instructions to achieve equivalent functionality to the synchronized method without actually locking the object. When the synchronized instructions are fully executed, the thread invokes the instructions for the "simpleLockRelease( )" function. The "simpleLockRelease( )" function, when executed, makes a call to the OS and releases the thread scheduler lock, thus ceasing to prevent the thread scheduler from scheduling other threads.

In this way, the fast synchronization techniques described herein provide for executing synchronized instructions with less locking overhead in lieu of the synchronized method (which, if executed, would require the execution of dozens of instructions to lock and then unlock the object being synchronized on).

Fast Synchronization by Using a Microlock

FIG. 1B is a block diagram of computer system 100B in which an embodiment may be implemented. In this embodiment, JVM 104 provides microlock 110B that is used by the JVM to ensure that locking and unlocking operations on Java objects are performed by threads in an atomic manner.

A typical JVM provides only a single object microlock that is implemented as a global byte in shared memory. In normal operation, whenever a thread needs to perform a locking or unlocking operation on a Java object, the thread makes a call to the JVM to obtain the microlock. Obtaining the microlock prevents any other thread from attempting to perform any locking or unlocking operations on any object. Thus, when a thread obtains the microlock the thread performs its locking or unlocking operation in an atomic manner. If a thread requests but fails to obtain the microlock, the thread "spins" (i.e. goes in a loop in which it sleeps for a very short period of time) and then attempts to obtain the microlock again. (More specifically, in normal operation a JVM thread obtains the microlock in the following way. The microlock byte in memory holds a "0" if no thread owns the microlock and "−1" if the microlock is owned by some thread. A thread, which makes a JVM call to obtain the microlock, basically executes an atomic swap instruction on the microlock byte—the atomic swap instruction stores the value "−1" in the microlock byte and at the same time copies the value previously stored in the microlock byte into a register. The thread then executes one or more instructions to check the value returned in the register. If the value in the register is "0", then the thread has successfully obtained the microlock. If the value in the register is "−1", then the atomic swap instruction did not obtain the microlock since the microlock was already owned by some other thread; in this case the thread executes a sequence of instructions that cause the thread to spin.)

According to the fast synchronization techniques described herein, in this embodiment the JVM provides a "simpleLockGrab( )" function which is used to achieve synchronization on an object by using the JVM microlock but without actually locking the object. When a current thread needs to execute a synchronized method, in order to determine whether synchronized instructions can be executed with less locking overhead in lieu of the synchronized method, the current thread executes a set of conditional invocation instructions, which have been generated by a JIT compiler during dynamic compilation and which include instructions for executing the "simpleLockGrab( )" function.

The "simpleLockGrab( )" function, when executed, executes an atomic swap instruction to obtain the microlock. If the atomic swap instruction fails (for example, if the microlock is owned by another thread), then the "simpleLockGrab( )" function does not cause the calling thread to spin but returns failure instead. (It is noted that, contrary to normal operation, the fast synchronization techniques described herein do not cause the calling thread to spin when it fails to obtain the microlock.) In response to receiving the failure from the "simpleLockGrab( )" function, the set of conditional invocation instructions causes the thread to execute the regular bytecodes for the synchronized method. If the "simpleLockGrab( )" function successfully obtains the microlock, then the "simpleLockGrab( )" function makes a check to determine whether the object is locked by another thread. If the object is already locked by another thread, then the "simpleLockGrab( )" function releases the microlock and returns failure, and the set of conditional invocation instructions causes the thread to execute the regular bytecode for the synchronized method.

If the object is not locked by any other thread, the "simpleLockGrab( )" function returns success. At this point the current thread holds the microlock and thus prevents any other thread from performing any locking and unlocking operation on any object. In response to receiving success from the "simpleLockGrab( )" function, the set of conditional invocation instructions causes the thread to execute, in lieu of the synchronized method, the synchronized instructions that provide equivalent functionality to the synchronized method. It is noted that the current thread holds the microlock for the duration of the execution of the synchronized instructions; further, the current thread executes the synchronized instructions to achieve equivalent functionality to the synchronized method without actually locking the object. When the synchronized instructions are fully executed, the thread invokes the instructions for the "simpleLockRelease( )" function. Because there is no need to check the contents of the microlock byte (which is known to be "−1" at this point), the "simpleLockRelease( )" function releases the microlock by executing a regular store instruction (e.g. an instruction that simply stores a "0" in the microlock byte), which is much less expensive to execute than an atomic swap instruction.

Performing synchronization on an object as described in this section requires a lot fewer instructions in order to complete the locking and unlocking operations since the thread never actually locks the object. Further, performing synchronization in this way requires the execution of only one atomic swap instruction since the "simpleLockRelease( )" function does not execute an atomic swap instruction (in contrast, a normal unlocking operation would require grabbing the microlock first). In this way, the fast synchronization techniques described herein provide for executing synchronized instructions with less locking overhead in lieu of the synchronized method itself.

Table 1 below provides the instructions that are emitted by a JIT compiler for the "sizeSimpleSync( )" method depicted in FIG. 2B. (The instructions provided in Table 1 are for performing fast synchronization by using a microlock, and are represented using the ARM instruction set.) The instructions for the "sizeSimpleSync( )" method that may be inlined in other code are almost exactly the same as the instructions depicted in Table 1. (In Table 1, the portion of the lines preceded by the symbol "@" are comments that are not executable instructions; further, the "@ section N" notation is provided to illustrate how the instructions in Table 1 correspond to the source code of the "sizeSimpleSync( )" method.)

TABLE 1

Instructions for the "sizeSimpleSync( )" method of FIG. 2B
Instructions for sizeSimpleSync( )

```
            ldr    v3, [rJFP, #−8]              @ Java local cell # 0
@ section 1: invoke simpleLockGrab( )
            ldr    ip, [pc, #124]               @ &objGlobalMicrolock - address of the microlock byte
            mov    v8, #255                     @ value of "−1" indicates microlock is locked
            swp    v8, v8, [ip]                 @ swap "−1" into the microlock byte, return into ip
            cmp    v8, #255                     @ check if microlock is locked
            beq    failed                       @ branch to label "failed" if microlock is locked
            ldr    lr, [v3, #+4]                @ get the header of the object being synchronized on
            and    lr, lr, #3                   @ get the object's sync bits
            cmp    lr, #2                       @ check if the object is locked
            mov    v8, #1                       @ assume object not locked: return result = true
            beq    done                         @ branch to label "done" if object is not locked
            mov    v8, #0                       @ value of "0" indicates microlock is locked
            str    v8, [ip, #+0]                @ store "0" in the microlock byte if object was locked
failed:
            mov    v8, #0                       @ microlock was locked: return result = false
done:
            @ check whether   simpleLockGrab( )   succeeded
            cmp    v8, #0                       @ check for failure (#0)
            beq    L1                           @ branch to block that calls the regular size( ) method
```

TABLE 1-continued

Instructions for the "sizeSimpleSync( )" method of FIG. 2B
Instructions for sizeSimpleSync( )

```
@ section 2: equivalent functionality to the size( ) method
        ldr     v8, [v3, #+16]              @ get the element count from the object
@ section 3: invoke  simpleLockRelease( )
        mov     lr, #0                      @ "0" indicates the microlock is released
        str     lr, [ip, #+0 ]              @ store "0" in the microlock byte
@ section 4: return the element count from the  sizeSimpleSync( )  method
        str     v8, [rJFP, #−8]             @ Java local cell # 0
        sub     JSP, JFP, #4
        ldr     v3, [rJFP, #+0]!
        bl      CVMCCMreturnFromMethod      @ return from the sizeSimpleSync( )  method
L1:
@ section 5: call the bytecodes for the regular  size( )  method
        str     v3, [rJSP], #+4
        ldr     a1, [pc, #24]               @ method block for the size( ) method in  java.util.Vector
        mov     lr, pc LSL #0               @ set up the return address
        ldr     pc, [a1, #+0]               @ call the size( ) method through the method block
        ldr     v8, [rJSP, #−4]!
        @ return the element count for the object from the regular  size( )  method
        str     v8, [rJFP, #−8]             @ Java local cell # 0
        sub     JSP, JFP, #4
        ldr     v3, [rJFP, #+0]
        bl      CVMCCMreturnFromMethod      @ return from the  size( )  method
```

The instructions illustrated in section 1 of Table 1 correspond to source code line 206A in FIG. 2B, and provide for executing the "simpleLockGrab( )" function to obtain the microlock and for determining whether synchronized instructions can be executed with less locking overhead in lieu of the "size( )" synchronized method. The instructions in section 2 of Table 1 correspond to source code line 206B in FIG. 2B, and provide for determining the element count for the object on which synchronization is performed (which is equivalent to the functionality of the "size( )" method). The instructions in section 3 of Table 1 correspond to source code line 206C in FIG. 2B, and provide for executing the "simpleLock Release( )" function to release the microlock. The instructions in section 4 of Table 1 correspond to source code line 206D in FIG. 2B, and provide for returning the element count for the object from "sizeSimpleSync( )" method. The instructions in section 5 of Table 1 correspond to source code line 208 in FIG. 2B, and provide for invoking the regular bytecodes of the "size( )" method when it is determined that synchronized instructions cannot be executed with less overhead in lieu of the "size( )" method.

Fast Synchronization by Using an Atomic Compare-and-Swap Instruction

FIG. 1C is a block diagram of computer system 100C in which an embodiment may be implemented. The hardware platform, on which computer system 100C is implemented, provides an atomic compare-and-swap instruction that is used by JVM 104 to ensure that locking and unlocking operations on Java objects are performed by threads in an atomic manner. For example, in normal operation according to the fast locking approach, a JVM thread performs object synchronization by executing an atomic compare-and-swap instruction to atomically swap a pointer to a fast lock record (e.g. an FL data structure) into the header of the object being locked, rather than relying on a microlock to block out other threads while the swap happens. (An atomic compare-and-swap instruction, when executed, atomically performs two logical operations: first, the instruction compares to one of its operands the value that is to be swapped out, and if there is no match, the instruction fails; second, if the operand and the to-be-swapped-out value match, then the instruction swaps in a new value that is provided in another of its operands.)

With respect to FIG. 1C, when the fast synchronization techniques described herein are implemented on a hardware platform that supports atomic compare-and-swap instructions, JVM 104 provides a "simpleLockGrab( )" function which is used to achieve synchronization on an object by using an atomic compare-and-swap instruction to lock the object with less locking overhead than the regular synchronized method. JVM 104 dedicates a lock record (such as thread lock record 110C) to each thread when the thread is initialized, where the thread uses its dedicated lock record specifically for performing fast synchronization as described herein. Further, the lock record is initialized with a re-entry counter equal to the constant value of "1" because the lock record will never be re-entered (e.g. once a simple synchronized method or synchronized block is entered, the thread will perform no further synchronization until it exits the synchronized method or block). When a current thread needs to execute a simple synchronized method, in order to determine whether synchronized instructions can be executed with less locking overhead in lieu of the synchronized method, the current thread executes a set of conditional invocation instructions, which have been generated by a JIT compiler during dynamic compilation and which include instructions for executing the "simpleLockGrab( )" function.

When executed from a current thread, the "simpleLockGrab( )" function first retrieves the current header of the object. Based on the object header, the "simpleLockGrab( )" function then determines whether the object is already locked by another thread. If the object is already locked, then the "simpleLockGrab( )" function returns failure, and the set of conditional invocation instructions causes the thread to execute the regular bytecodes for the synchronized method. If the object is not locked, the "simpleLockGrab( )" function stores a pointer to the object and the object header word in the lock record that is dedicated for fast synchronization to the current thread. The "simpleLockGrab( )" function then executes an atomic compare-and-swap instruction to swap into the object header a pointer to the lock record while expecting back the same object header word that was previously stored in the lock record. If the atomic compare-andswap instruction fails (e.g. if another thread has changed the object header word, then the atomic compare-and-swap instruction will fail because there is a mismatch between what is stored in the object header and the comparison operand of the instruction), then the "simpleLockGrab( )" function returns failure, and the set of conditional invocation instructions causes the thread to execute the regular bytecodes for the synchronized method.

If the atomic compare-and-swap instruction succeeds, then the "simpleLockGrab( )" function returns success. At this point the current thread holds a lock on the object—the object header contains a pointer to the lock record that is associated with the current thread. (If another thread contends for a lock on the object, then the lock record can be inflated to use a heavy-weight locking mechanism, such as a mutex). In response to receiving success from the "simpleLockGrab( )" function, the set of conditional invocation instructions causes the thread to execute, in lieu of the synchronized method, the synchronized instructions that provide equivalent functionality to the synchronized method. It is noted that, contrary to normal operation, the current thread obtains a lock on the object with much fewer instructions; further, locking the object in the above manner allows a JIT compiler to inline all instructions necessary for locking as well as the synchronized instructions, thus providing a further performance advantage over execution of the regular synchronized method which normally cannot be easily inlined.

When the synchronized instructions are fully executed, the thread invokes the instructions for the "simpleLock Release( )" function. When executed, the "simpleLockRelease( )" function retrieves the old object header word from the lock record associated with the thread. The "simpleLock Release( )" function then executes an atomic compare-and-swap instruction to swap into the object header the old object header word while expecting back the (unmodified) pointer to the lock record. If the atomic compare-and-swap instruction succeeds, then the object is unlocked. If the atomic compare-and-swap instruction fails (e.g. the lock record was inflated to use a heavy-weight lock), then the "simpleLockRelease( )" function executes a series of instructions to unlock the object in the same way as this is accomplished according to the fast locking approach in normal operation.

Performing synchronization on an object as described in this section requires fewer instructions in order to complete the locking and unlocking operations on the object. Implementing the "simpleLockGrab( )" function through an atomic compare-and-swap instruction allows for the object to be locked by associating the object with a dedicated per-thread lock record, which is initialized and pre-populated with information when the thread is created by the JVM long before the thread needs to lock an object. Further, locking the object with a dedicated per-thread lock provides for faster execution. In this way, fast synchronization by using an atomic compare-and-swap instruction provides for executing synchronized instructions (which provide equivalent functionality to a synchronized method) with much less overhead than the execution of the synchronized method itself.

Figure 4:
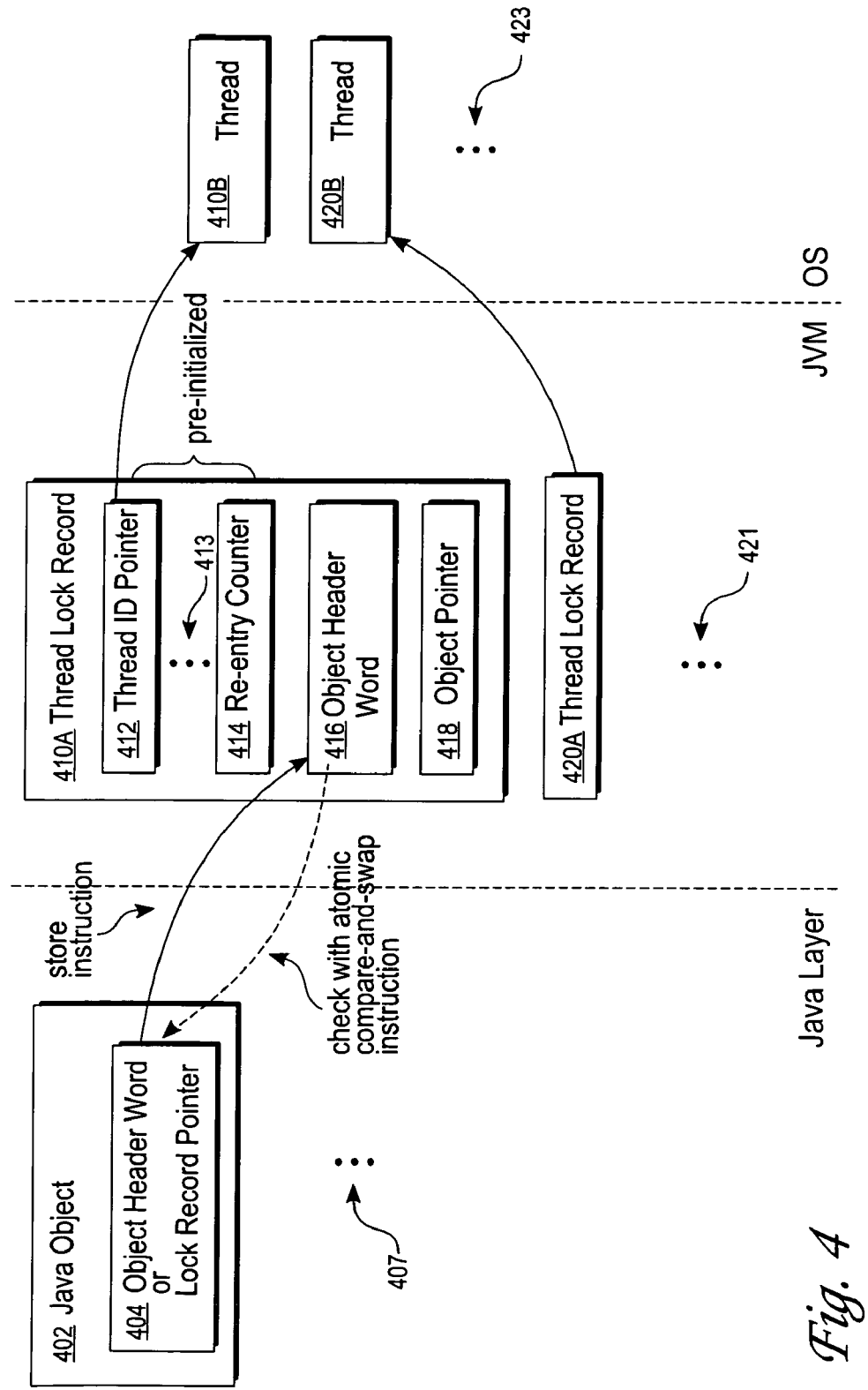
FIG. 4 is a functional block diagram illustrating one implementation for locking an object by using an atomic compare-and-swap instruction according to one embodiment.

FIG. 4 is a functional block diagram illustrating one implementation for locking an object by using an atomic compare-and-swap instruction according to one embodiment. In FIG. 4, a Java layer includes java objects, such as Java object 402 (ellipsis 407 indicate that the Java layer may include any number of Java objects). The JVM stores in memory thread lock records for all threads initialized by the JVM, such as thread lock records 410A and 420A (ellipsis 421 indicates that the JVM may store any number of thread lock records).

The OS runs the threads initialized by the JVM, such as thread 410B that is associated with thread lock record 410A, and thread 420B that is associated with thread lock record 420A (ellipsis 423 indicates that the OS may run any number of threads that are initialized by the JVM).

According to the fast synchronization techniques described herein, when the JVM initializes thread 410B, the JVM also creates and initializes thread lock record 410A. Lock record 410A includes thread pointer 412 (which identifies thread 410B as the thread to which the lock record is dedicated), and re-entry counter 414 which is initialized to a constant value of "1" because the lock record will not be re-entered. Lock record 410A may include other fields (as indicated by ellipsis 413) that are pre-populated with information when the JVM initializes thread 410B. Lock record 410A also includes object header word field 416 (for storing the original object header word of an object that is to be locked), and object pointer field 418 (for storing a pointer to the synchronized object).

Suppose that in operation a current thread executes the "simpleLockGrab( )" function to lock Java object 402 according the fast synchronization techniques described in this section. The "simpleLockGrab( )" function, when executed, loads the object header word (that is stored in field 404 of Java object 402) and checks the object header word to see if the object is locked. If the object is not locked, the "simpleLockGrab( )" function stores the value of the object header word from field 404 into field 416 of lock record 410A, and stores a pointer to the object being locked into field 418 of lock record 410A. Then, the "simpleLockGrab( )" function executes an atomic compare-and-swap instruction to swap into field 404 (of Java object 402) a pointer to thread lock record 410A. (Thus, it is noted that field 404 of Java object 402 stores either an object header word which indicates that the object is not locked, or a pointer to a thread lock record when the object is locked.) Simultaneously with swapping the pointer to thread lock record 410A into field 404, the atomic compare-and-swap instruction expects back the value that was previously stored into field 416 (of thread lock record 410A), which in turn was previously loaded from field 404 of Java object 402. If the atomic compare-and-swap instruction succeeds, then the pointer to lock record 410A is stored in field 404 of Java object 402, which indicates that thread 410B has locked the object.

The techniques described with respect to FIG. 4 avoid the setting up of a fast lock record (e.g. a FL data structure) that would be required according to the fast locking approach if the regular bytecodes of a synchronized method had been executed. Thus, the techniques described herein provide for executing fewer instructions to lock the object at runtime which results in faster execution. (As illustrated in FIG. 4, among other instructions, the "simpleLockGrab( )" function needs to execute one instruction to retrieve the object header word and one atomic compare-and-swap instruction to swap in the lock record pointer; however, the instructions executed by the "simpleLockGrab( )" function are still fewer than the number of instructions that would be executed by the regular synchronization code.) The fast synchronization techniques described herein provide for improved execution performance over the regular bytecodes of synchronized method because most of the fields in the lock record are pre-populated when the thread is created and do not need to be initialized when the thread wants to lock an object. Moreover, the fields in the lock record that are pre-populated persist throughout the life of the thread, which results in a more efficient execution of the thread. Also, since the fast synchronization techniques described herein provide one dedicated thread lock record per thread, so there is no overhead incurred for finding and tracking lock records. In this way, the fast synchronization techniques described herein provide for avoiding the locking overhead and the lock structure set-up overhead that would be otherwise incurred when the regular bytecodes of the synchronized method uses the fast locking approach to synchronize on an object.

Simple Synchronized Methods

In one embodiment, the fast synchronization techniques described herein are performed by threads running in a JVM on simple synchronized methods that need to satisfy at least some of a plurality of conditions. (The fast synchronization techniques described herein also apply to any region of code that synchronizes on an object, such as a Java "synchronized" block.) The conditions, which a simple synchronized method (or a "synchronized" block) must satisfy, place a number of restrictions on operations that the simple synchronized method (or a "synchronized" block) or substitute code thereof can perform after the call to the "simpleLockGrab( )" function and before the call to the "simpleLockRelease( )" function is called. Examples of some conditions are provided below:

The simple synchronized method cannot throw an exception, either directly or indirectly. Examples of exceptions that the simple synchronized method should not throw include the NullPointerException and the ArrayIndexOutOfBoundsException.

The simple synchronized method cannot call any method that would not be inlined within the synchronized method by the JIT compiler of the JVM because calling a non-inlined method involves pushing a new frame on the stack, which in turn may throw an exception.

The simple synchronized method cannot call any other synchronized method because the locking code for the two synchronized methods may deadlock.

The conditions provided above are merely exemplary of conditions that may be imposed on a synchronized method in order to identify the synchronized method as a candidate to which the fast synchronization techniques described herein may be implemented. In one embodiment, the fast synchronization techniques require that a simple synchronized method satisfy all of the above three conditions. In other embodiments, however, the fast synchronization techniques may require that simple synchronized method satisfy only some but not all of the above three conditions. In yet other embodiments, other conditions apart from the above three conditions may be imposed on simple synchronized methods in order to identify these methods as candidates for fast synchronization as described here. Thus, the conditions provided above are to be regarded in an illustrative rather than a restrictive sense.

In addition, in some embodiments, substitute code for synchronized methods may be written by a programmer or generated automatically in such a way as to satisfy any conditions that these embodiments may have imposed on the synchronized methods. Examples of such substitute code are provided in the two sections that follow.

EXAMPLE #1

Avoiding Null-Pointer Exceptions

Consider the following "capacity( )" method that is found in the "java.util.Vector" class:

```
public synchronized int capacity( ){
return elementData.length;
}
```

The above "capacity( )" method provides for accessing the length of an array, and the array can be NULL. Thus, a Null-Pointer Exception (NullPointerException) may be thrown when the array length is accessed at runtime.

Since a synchronized method should not throw an exception if fast synchronization is to be performed, the substitute code registered with the JVM for the above synchronized "capacity( )" method needs to perform extra checks in order to prevent the throwing of a NullPointerException at runtime. An example of such substitute code with extra checks is provided below:

```
private int capacitySimpleSync( ){
  if (CVM.simpleLockGrab(this)) {
    Object[ ] data=elementData;
    int resilt;
    boolean gotResult;
    if (data !=null) {
      result=data.length;
      gotResult=true;
    } else {
      result=0;
      gotResult=false;
    }
    CVM. SimpleLockRelease(this);
    if (gotResult) {
      return Result;
    }
  }
  return capacity( ):
}
```

It is noted that the above "capacitySimpleSync( )" method is not a synchronized method. Further, after the above "capacitySimpleSync( )" method executes the "simpleLockGrab( )" function, the "elementData" array is checked to make sure that the array is not NULL in order to avoid risking the throwing of a NullPointerException at runtime. It is noted that this check is performed after executing the "simpleLockGrab( )" function because in the "java.util.Vector" class all changes to a java.util.Vector instance are synchronized to the instance. Further, the above "capacitySimpleSync( )" method provides checks for protecting against the "elementData" array changing from non-NULL to NULL after the java.util.Vector instance has been locked (for example, by maliciously or poorly written sub-class that might allow the array to be changed when locked). For this reason, the "capacitySimpleSync( )" method provides for copying the "elementData" array into the local variable "data", and then performing any subsequent access to the array length through the local variable.

EXAMPLE #2

Avoiding Calls to Non-Inlinable Methods

Consider the following "String" constructor:
```
public String (StringBuffer buffer){
synchronized (buffer) {
   buffer.setShared( );
   this.value=buffer.getValue( );
   this.offset=0;
   this.count=buffer.lengthNoSync( );
}
}
```
Even though the above "String" constructor itself is not actually synchronized, the constructor includes a region of code that synchronizes on the "buffer" input argument. Thus, the fast synchronization techniques described herein may be used for synchronizing this region of code provided that it is ensured that the methods called from within the synchronized region will be inlined by the JIT compiler of the JVM.

An example of substitute code comprising two methods, which are called from within the synchronized region and which can be inlined by the JIT compiler, is provided below:
```
private void initSimpleSync (StringBuffer buffer){
   if (buffer !=null && CVM.simpleLockGrab(buffer) {
       buffer.setShared( );
       this.value=buffer.getValue( );
       this.offset=0;
       this.count=buffer.lengthNoSync( );
       CVM.simpleLockRelease( );
       return;
   }
   initSync(buffer);
}
private void initSync (StringBuffer buffer){
synchronized (buffer) {
   buffer.setShared( );
   this.value=buffer.getValue( );
   this.offset=0;
   this.count=buffer.lengthNoSync( );
}
}
```
It is noted that while the above "initSimpleSync" method includes calls to other methods (e.g. "setShared( )", "getValue( )", and "lengthNoSync( )" methods), these methods are trivial and will always get inlined by the JIT compiler, unless the inlining depth or some other limit is exceeded. To ensure that these methods will always be inlined, a flag in the JVM may be set; during compiler time, the JIT compiler checks this flag and ensures that these methods (as well as any methods that they call) will all be inlined.

Hardware Overview

Figure 5:
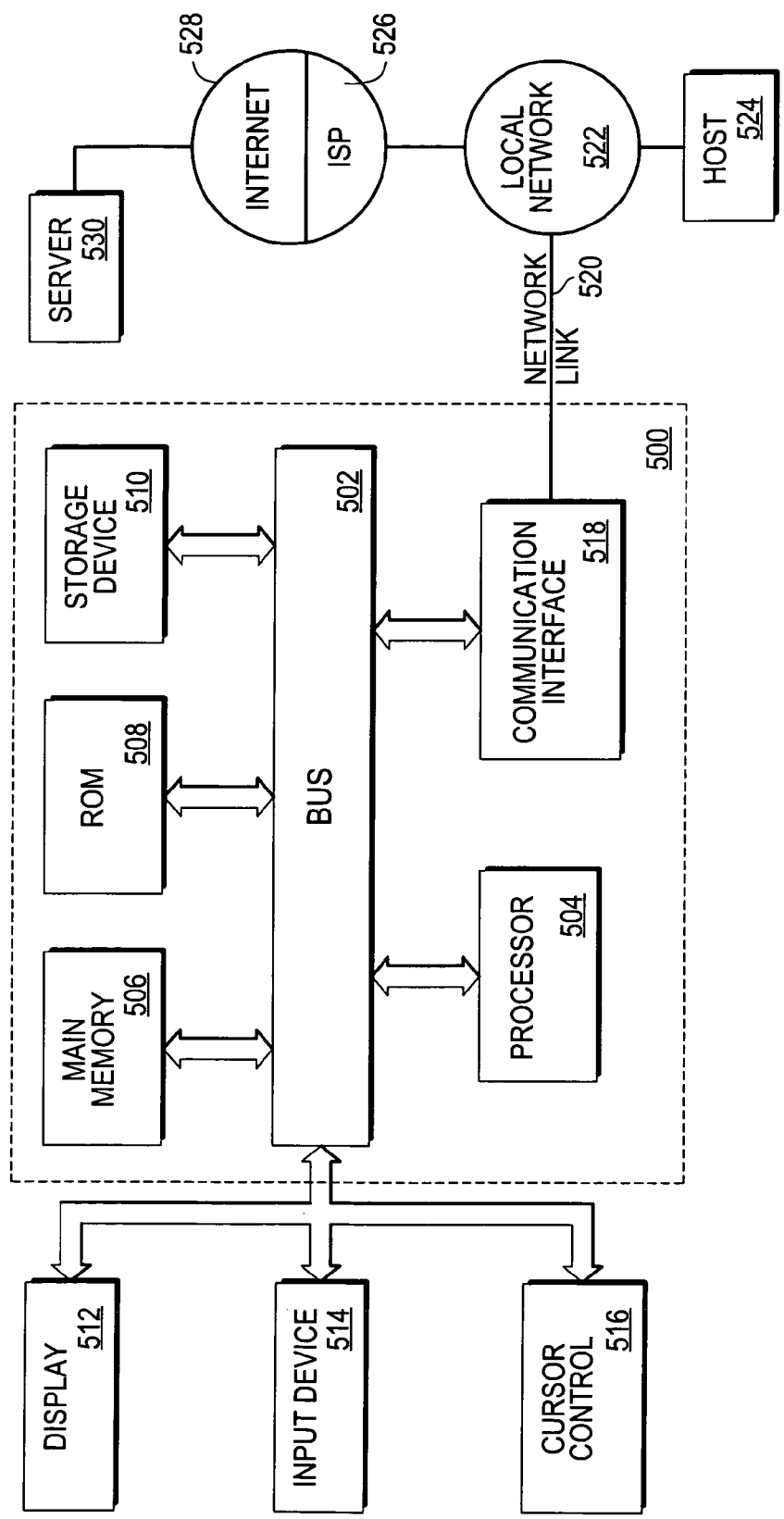
FIG. 5 is a block diagram that illustrates a computer system upon which an embodiment may be implemented.

FIG. 5 is a block diagram that illustrates a computer system upon which an embodiment of the fast synchronization techniques described herein may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enable information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enable information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the fast synchronization techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media.

Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to specific embodiments, it should not be construed to be so limited. Various modifications may be made by those of ordinary skill in the art with the benefit of this disclosure without departing from the spirit of the invention. These and other modifications are within the scope of the present invention. Thus, the invention should not be limited by the specific embodiments used to illustrate it but only by the scope of the issued claims and the equivalents thereof.

The invention claimed is:

1. A machine implemented process for fast synchronization, comprising:
    detecting, during compile time, an invocation of a synchronized method in a set of code;
    accessing, during compile time, preregistered substitute code for the synchronized method, wherein the substitute code is different than the set of code;
    generating, during compile time, a set of instructions using the substitute code;
    producing, during compile time, a set of conditional invocation instructions for conditionally invoking the synchronized method;
    determining, during runtime, whether the set of instructions can be fully executed in lieu of invoking the synchronized method, wherein the synchronized method requires locking of a particular object, wherein determining that the set of instructions can be fully executed in lieu of invoking the synchronized method comprises:
        determining whether a set of one or more conditions for the conditional invocation instructions are met, and determining that the particular object is not locked, wherein the set of instructions is being executed by a current thread, wherein one of the conditions in the set of conditions is whether the particular object is currently locked after a thread scheduler lock, which prevents all other threads from being scheduled, is obtained, wherein if the particular object is currently locked, then it is determined that the set of instructions cannot be fully executed in lieu of invoking the synchronized method, and wherein the set of instructions provides equivalent functionality to the synchronized method with less locking overhead than the synchronized method;
    in response to a determination that the set of instructions can be fully executed in lieu of invoking the synchronized method, fully executing the set of instructions to achieve equivalent functionality to the synchronized method, and foregoing invocation of the synchronized method without locking the particular object; and
    in response to a determination that the set of instructions cannot be fully executed in lieu of invoking the synchronized method, invoking the synchronized method.

2. The process of claim 1, wherein achieving equivalent functionality to the synchronized method without locking the particular object comprises:
    obtaining the thread scheduler lock, wherein the thread scheduler lock prevents all other threads from being scheduled; and
    holding the thread scheduler lock while executing the set of instructions.

3. The process of claim 2, wherein achieving equivalent functionality to the synchronized method without locking the particular object further comprises:
  after obtaining the thread scheduler lock, fully executing the set of instructions; and
  after fully executing the set of instructions, releasing the thread scheduler lock.

4. The process of claim 1, wherein achieving equivalent functionality to the synchronized method without locking the particular object comprises:
  obtaining a microlock, wherein the microlock prevents all other threads from obtaining a lock on any object; and
  holding the microlock while executing the set of instructions.

5. The process of claim 4, wherein achieving equivalent functionality to the synchronized method without locking the particular object further comprises:
  after obtaining the microlock, fully executing the set of instructions; and
  after fully executing the set of instructions, releasing the microlock.

6. The process of claim 1, wherein one of the conditions in the set of conditions is whether a microlock, which prevents all other threads from obtaining a lock on any object, can be obtained without blocking, and wherein if the microlock cannot be obtained without blocking, then it is determined that the set of instructions cannot be fully executed in lieu of invoking the synchronized method.

7. The process of claim 1, wherein the set of one or more conditions comprises:
  a first condition indicating that the synchronized method would not throw any exceptions when invoked;
  a second condition indicating that the synchronized method would not call any method that would not be inlined within the synchronized method during compile time; and
  a third condition indicating that the synchronized method would not call any other synchronized methods when invoked.

8. The process of claim 1, wherein the process is implemented in a computer system capable of generating compiled code.

9. The process of claim 8, wherein the process is implemented in a Java virtual machine.

10. A machine implemented process for fast synchronization, comprising:
  detecting, during compile time, an invocation of a synchronized method in a set of code;
  accessing, during compile time, preregistered substitute code for the synchronized method, wherein the substitute code is different than the set of code;
  generating, during compile time, a set of instructions using the substitute code;
  producing, during compile time, a set of conditional invocation instructions for conditionally invoking the synchronized method;
  determining, during runtime, whether the set of instructions can be fully executed in lieu of invoking the synchronized method, wherein the synchronized method requires locking of a particular object, wherein determining that the set of instructions can be fully executed in lieu of invoking the synchronized method comprises:
    determining whether a set of one or more conditions for the conditional invocation instructions are met, and
    determining that the particular object is not locked, wherein the set of instructions is being executed by a current thread, wherein one of the conditions in the set of conditions is whether the particular object is currently locked after a thread scheduler lock, which prevents all other threads from being scheduled, is obtained, wherein if the particular object is currently locked, then it is determined that the set of instructions cannot be fully executed in lieu of invoking the synchronized method, and wherein the set of instructions provides equivalent functionality to the synchronized method with less locking overhead than the synchronized method;
  in response to a determination that the set of instructions can be fully executed in lieu of invoking the synchronized method, fully executing the set of instructions to achieve equivalent functionality to the synchronized method, and foregoing invocation of the synchronized method, by locking the particular object by using a particular lock record dedicated to a particular thread; and
  in response to a determination that the set of instructions cannot be fully executed in lieu of invoking the synchronized method, invoking the synchronized method.

11. The process of claim 10, wherein, when the current thread is being created and initialized during runtime, the process further comprises:
  creating a lock record dedicated to the current thread; and
  initializing the lock record with invariant information.

12. The process of claim 11, wherein achieving equivalent functionality to the synchronized method further comprises:
  storing a copy of a header of the particular object into the lock record, and storing an object pointer referencing the particular object into the lock record; and
  after storing the copy of the header and the object pointer into the lock record, executing an atomic compare-and-swap instructions to swap a lock pointer into the header of the particular object, wherein the lock pointer references the lock record dedicated to the current thread, and wherein the lock pointer when stored in the particular object prevents all other threads from obtaining a lock on the particular object.

13. The process of claim 12, wherein executing the atomic compare-and-swap instruction comprises:
  determining whether the atomic compare-and-swap instruction executes successfully; and
  in response to a determination that the atomic compare-and-swap instruction did not execute successfully, causing the synchronized method to be invoked by determining that the set of instructions cannot be fully executed in lieu of invoking the synchronized method.

14. The process of claim 12, wherein achieving equivalent functionality to the synchronized method further comprises:
  after successfully executing the atomic compare-and-swap instruction, fully executing the set of instructions; and
  after fully executing the set of instructions, unlocking the particular object by storing, into the particular object, the copy of the header that is stored in the lock record.

15. A non-transitory machine readable medium, comprising:
  instructions for causing one or more processors to detect, during compile time, an invocation of a synchronized method in a set of code;
  instructions for causing one or more processors to access, during compile time, preregistered substitute code for the synchronized method, wherein the substitute code is different than the set of code;
  instructions for causing one or more processors to generate, during compile time, a set of instructions using the substitute code;

instructions for causing one or more processors to produce, during compile time, a set of conditional invocation instructions for conditionally invoking the synchronized method;

instructions for causing one or more processors to determine, during runtime, whether the set of instructions can be fully executed in lieu of invoking the synchronized method, wherein the synchronized method requires locking of a particular object, wherein determining that the set of instructions can be fully executed in lieu of invoking the synchronized method comprises:

determining whether a set of one or more conditions for the conditional invocation instructions are met, and determining that the particular object is not locked, wherein the set of instructions is being executed by a current thread, wherein one of the conditions in the set of conditions is whether the particular object is currently locked after a thread scheduler lock, which prevents all other threads from being scheduled, is obtained, wherein if the particular object is currently locked, then it is determined that the set of instructions cannot be fully executed in lieu of invoking the synchronized method, and wherein the set of instructions provides equivalent functionality to the synchronized method with less locking overhead than the synchronized method;

instructions for causing one or more processors to fully execute the set of instructions to achieve equivalent functionality to the synchronized method, and foregoing invocation of the synchronized method in response to a determination that the set of instructions can be fully executed in lieu of invoking the synchronized method by locking the particular object by using a particular lock record dedicated to a particular thread; and instructions for causing one or more processors to invoke the synchronized method in response to a determination that the set of instructions cannot be fully executed in lieu of invoking the synchronized method.

16. The non-transitory machine readable medium of claim 15, wherein one of the conditions in the set of conditions is whether a microlock, which prevents all other threads from obtaining a lock on any object, can be obtained without blocking, and wherein if the microlock cannot be obtained without blocking, then it is determined that the set of instructions cannot be fully executed in lieu of invoking the synchronized method.

17. The non-transitory machine readable medium of claim 15, wherein the machine readable medium further comprises:

instructions for causing one or more processors to create a lock record dedicated to the current thread when the current thread is being created and initialized during runtime; and instructions for causing one or more processors to initialize the lock record with invariant information when the current thread is being created and initialized during runtime.

18. The non-transitory machine readable medium of claim 17, wherein the instructions for causing one or more processors to achieve equivalent functionality to the synchronized method further comprise:

instructions for causing one or more processors to store a copy of a header of the particular object into the lock record and to store an object pointer referencing the particular object into the lock record, in response to a determination that the particular object is not locked by any thread; and instructions for causing one or more processors to execute an atomic compare-and-swap instruction to swap a lock pointer into the header of the particular object after storing the copy of the header and the object pointer into the lock record, wherein the lockpointer references the lock record dedicated to the current thread, and wherein the lock pointer when stored in the particular object prevents all other threads from obtaining a lock on the particular object.

19. The non-transitory machine readable medium of claim 18, wherein the instructions for causing one or more processors to execute the atomic compare-and-swap instruction comprise:

instructions for causing one or more processors to determine whether the atomic compare-and-swap instruction executes successfully; and instructions for causing one or more processors to cause the synchronized method to be invoked by determining that the set of instructions cannot be fully executed in lieu of invoking the synchronized method in response to a determination that the atomic compare-and-swap instruction did not execute successfully.

20. The non-transitory machine readable medium of claim 18, wherein the instructions for causing one or more processors to achieve equivalent functionality to the synchronized method further comprise:

instructions for causing one or more processors to fully execute the set of instructions after successfully executing the atomic compare-and-swap instruction; and instructions for causing one or more processors to unlock the particular object after fully executing the set of instructions by storing, into the particular object, the copy of the header that is stored in the lock record.

21. The non-transitory machine readable medium of claim 15, wherein the set of one or more conditions comprises:

a first condition indicating that the synchronized method would not throw any exceptions when invoked;

a second condition indicating that the synchronized method would not call any method that would not be inlined within the synchronized method during compile time; and a third condition indicating that the synchronized method would not call any other synchronized methods when invoked.

22. The non-transitory machine readable medium of claim 15, wherein the non-transitory machine readable medium is located in a computer system capable of generating compiled code.

23. The non-transitory machine readable medium of claim 21, wherein the instructions for causing one or more processors to detect, during runtime, an invocation of a synchronized method in a set of code are configured to be implemented in a Java virtual machine.

* * * * *